(12) United States Patent
Hulen

(10) Patent No.: US 8,443,794 B2
(45) Date of Patent: *May 21, 2013

(54) SYSTEMS AND METHODS FOR OPERATING ENVIRONMENTAL EQUIPMENT UTILIZING ENERGY OBTAINED FROM MANUFACTURED SURFACE COVERINGS

(76) Inventor: Michael S. Hulen, Acton, MA (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/641,198

(22) Filed: Dec. 17, 2009

(65) Prior Publication Data

US 2010/0154785 A1 Jun. 24, 2010

Related U.S. Application Data

(60) Provisional application No. 61/138,143, filed on Dec. 17, 2008.

(51) Int. Cl.
F24J 2/00 (2006.01)

(52) U.S. Cl.
USPC .............................. 126/623; 126/569; 126/643

(58) Field of Classification Search
USPC ................. 126/623, 609, 613, 621, 633, 636, 126/643, 569; 165/48.2
See application file for complete search history.

(56) References Cited

U.S. PATENT DOCUMENTS

| | | | |
|---|---|---|---|
| 2,969,637 A | 1/1961 | Rowekamp | |
| 3,077,190 A | 2/1963 | Allen | |
| 3,390,672 A | 7/1968 | Snelling | |
| 3,931,806 A | 1/1976 | Hayes | |
| 3,957,109 A | 5/1976 | Worthington | |
| 3,968,652 A | 7/1976 | Chevalier | |
| 3,995,429 A | 12/1976 | Peters | |
| 3,995,965 A | 12/1976 | Cox | |
| 4,008,709 A * | 2/1977 | Jardine | 126/610 |
| 4,011,731 A | 3/1977 | Meckler | |
| 4,026,350 A | 5/1977 | Zembrzuski | |
| 4,037,652 A | 7/1977 | Brugger | |
| 4,052,858 A | 10/1977 | Jeppson | |
| 4,092,979 A | 6/1978 | Kotlarz | |
| 4,100,755 A | 7/1978 | Leonard | |
| 4,103,493 A * | 8/1978 | Schoenfelder | 60/641.11 |
| 4,126,122 A | 11/1978 | Bross | |

(Continued)

FOREIGN PATENT DOCUMENTS

| | | |
|---|---|---|
| DE | 3915833 | 11/1990 |
| JP | 178602 | 7/1989 |
| WO | WO 99/34155 A | 7/1999 |

OTHER PUBLICATIONS

Jooseng (Gavin) Gui, Patrick E. Phelan, Kamil E. Kaloush and Jay S. Golden, "Impact of Pavement Thermophysical Properties on Surface Temperatures", Journal of Materials in Civil Engineering, Aug. 2007, pp. 683-690.

(Continued)

*Primary Examiner* — Alfred Basichas

(57) ABSTRACT

Systems and methods for operating environmental equipment using heat absorbed by manufactured surface coverings from incident solar radiation where fluid in conduits carried in the manufactured surface covering is heated and supplied to a heat exchanger to provide heat for various environmental equipment such as a hot water supply, a turbine-driven electrical generator, a chiller, a water purification system, and/or a distillation system. Efficiencies are maximized by use of thermally conducted aggregates in the manufactured surface covering.

22 Claims, 10 Drawing Sheets

U.S. PATENT DOCUMENTS

| | | | |
|---|---|---|---|
| 4,132,074 A * | 1/1979 | Wendel | 60/641.8 |
| 4,153,104 A | 5/1979 | Ruder | |
| 4,230,175 A | 10/1980 | Disselbeck | |
| 4,246,886 A | 1/1981 | Sitzlar | |
| 4,252,487 A | 2/1981 | Jeppson | |
| 4,257,396 A | 3/1981 | Reinhart | |
| 4,257,481 A | 3/1981 | Dobson | |
| 4,267,822 A | 5/1981 | Diamond | |
| 4,296,740 A | 10/1981 | Meckler | |
| 4,300,536 A | 11/1981 | Taschuk | |
| 4,326,502 A | 4/1982 | Radenkovic | |
| 4,351,161 A | 9/1982 | Jones | |
| 4,483,325 A | 11/1984 | Siemiller | |
| 4,601,281 A | 7/1986 | Piper | |
| 4,613,409 A * | 9/1986 | Volland | 203/10 |
| 4,761,965 A | 8/1988 | Viner | |
| 5,069,199 A | 12/1991 | Messner | |
| 5,123,247 A | 6/1992 | Nelson | |
| 5,174,128 A | 12/1992 | Bourne | |
| 5,178,485 A | 1/1993 | Katsuragi | |
| 5,181,991 A | 1/1993 | Deutsch | |
| 5,182,912 A | 2/1993 | Parker | |
| 5,241,824 A | 9/1993 | Parker | |
| 5,257,876 A | 11/1993 | Takahashi | |
| 5,308,187 A | 5/1994 | Nix | |
| 5,348,622 A | 9/1994 | Deutsch | |
| 5,395,179 A | 3/1995 | Kotani | |
| 5,472,292 A | 12/1995 | Wiley | |
| 5,505,917 A | 4/1996 | Collier | |
| 5,605,418 A | 2/1997 | Watanabe | |
| 6,103,191 A | 8/2000 | Luker | |
| 6,176,101 B1 | 1/2001 | Lowenstein | |
| 6,182,453 B1 | 2/2001 | Forsberg | |
| 6,220,339 B1 | 4/2001 | Krecke | |
| 6,293,065 B1 | 9/2001 | Suzuki | |
| 6,446,625 B1 | 9/2002 | Tinari | |
| 6,494,995 B1 | 12/2002 | Battah | |
| 6,536,677 B2 | 3/2003 | Melendez-Gomez | |
| 6,539,738 B2 | 4/2003 | Gonzalez-Cruz | |
| 6,581,384 B1 | 6/2003 | Benson | |
| 6,758,630 B1 | 7/2004 | Vega | |
| 6,767,433 B2 | 7/2004 | Foster | |
| 6,820,439 B1 | 11/2004 | Marek | |
| 6,831,221 B2 | 12/2004 | Hulen | |
| 6,913,015 B2 | 7/2005 | Pajk | |
| 6,931,860 B2 | 8/2005 | Ryan | |
| 6,946,496 B2 | 9/2005 | Mankiewicz | |
| 7,062,913 B2 | 6/2006 | Christensen | |
| 7,127,894 B2 | 10/2006 | Battah | |
| 7,144,190 B1 | 12/2006 | Lyons | |
| 7,234,893 B2 | 6/2007 | Lyons | |
| 7,313,926 B2 | 1/2008 | Gurin | |
| 7,340,899 B1 | 3/2008 | Rubak | |
| 7,370,488 B2 | 5/2008 | Kidwell | |
| 7,373,785 B2 | 5/2008 | Kidwell | |
| 7,432,607 B2 | 10/2008 | Kim | |
| 7,501,713 B2 | 3/2009 | Fein | |
| 7,537,702 B2 | 5/2009 | Lupton | |
| 7,571,613 B1 | 8/2009 | Ryan | |
| 7,588,388 B2 | 9/2009 | Hall | |
| 7,608,171 B2 | 10/2009 | Otukol | |
| 2002/0061231 A1 | 5/2002 | Finzel et al. | |
| 2003/0033805 A1 | 2/2003 | Laviolette | |
| 2005/0188697 A1 | 9/2005 | Zyhowski et al. | |
| 2007/0056304 A1 | 3/2007 | Everett et al. | |
| 2009/0008599 A1 | 1/2009 | Fukishima | |

OTHER PUBLICATIONS

Brian Prowell, "Greening the Blacktop: Using Asphalt's Environmental Qualities to Compete", Hot Mix Asphalt Technology, vol. 13, No. 3, May/Jun. 2008, pp. 12-21.

* cited by examiner

SYSTEMS AND METHODS FOR OPERATING ENVIRONMENTAL EQUIPMENT UTILIZING ENERGY OBTAINED FROM MANUFACTURED SURFACE COVERINGS

CROSS-REFERENCE TO RELATED PATENT APPLICATION

This application claims priority from prior provisional patent application Ser. No. 61/138,143 filed Dec. 17, 2008, the entire disclosure of which is incorporated herein by reference.

BACKGROUND OF THE INVENTION

1. Field of the Invention

The present invention pertains to obtaining and using power/energy from man-made structures including manufactured (paved) surfaces and, more particularly, to using the power/energy in the form of heat obtained from solar radiation in the operation of energy conversion equipment, such as chillers, hot water supplies, heat pumps, organic Rankine cycle engines for mechanically generating electricity, water purification and distillation for buildings and/or other facilities.

2. Brief Discussion of the Related Art

Surfaces and structures are heated by solar radiation during the course of a typical sunny day. A typical asphalt or concrete surface has good heat-absorbing properties, and the heat energy from such structures is normally wasted and not utilized to its potential. Greater use of solar energy is an environmental friendly way of meeting increasing energy needs. In recent years, it has become increasingly evident that fossil fuels used to generate energy are finite and that their use is harmful to the environment. Large paved surfaces increase surface temperatures. The National Oceanic and Atmospheric Administration's National Geophysical Data Center relative to highways, streets, buildings, parking lots and other solid structures, notes that the total paved surface area of the 48 contiguous states of the United States of America and the District of Columbia is approximately 43,480 square miles (112,610 $km^2$). This same study further describes that 1.05% of the United States of America land area is constructed, impervious surface (83,337 $km^2$) and 0.43% of the world's land surface (579,703 $km^2$) is constructed, impervious surface. China has more impervious surface area than any other country (87,182 $km^2$) but has only 67 $m^2$ of impervious surface area per person, compared to 297 $m^2$ per person in the United States of America. Asphalt, concrete, bituminous roofs and other hard-paved surfaces absorb heat making it unpleasant to walk on a sidewalk in hot weather and increasing the strain on the air conditioning systems of buildings. Since hot air rises, the hot air traps airborne pollutants, such as auto exhaust, close to the ground adding to complications for pedestrians. The Portland Cement Association estimates that the "heat island effect" of concentrated areas of paved surfaces impervious to water increases the temperature of the paved areas by average of three to eight degrees. The most extreme increases take place in heavily paved areas, areas without shade, and areas paved with materials that don't reflect substantial light, such as asphalt. The heat island effect occurs in both small-town and urban commercial areas.

The organic Rankine cycle engine uses an organic, high molecular mass fluid with a liquid-vapor phase change, or boiling point, occurring at a lower temperature than the water-steam phase change. Accordingly, Rankine cycle heat recovery can be obtained from lower temperature sources such as industrial waste heat, geothermal heat, solar ponds and the like. Typically, the lower temperature heat is converted into useful work that can itself be converted into electricity.

Waste heat recovery is the most important development field for the organic Rankine cycle engine, as well as for absorption/adsorption chillers. Waste heat can be applied to heat and power plants (for example a small scale cogeneration plant for a domestic water heater) and also can be applied to industrial and farming processes such as organic products fermentation, hot exhausts from ovens or furnaces, flue gas condensation, exhaust gases from vehicles, inter-cooling of a compressor, and condenser of a power cycle.

As identified by the United States Environmental Protection Agency, developing urban areas modify their landscape. For example, solid and impermeable buildings, roads, and other infrastructure replace permeable and moist fields and vegetation. These changes cause urban regions to become warmer than their rural surroundings, forming an "island" of higher temperatures in the landscape. These heat islands occur on the surface and in the atmosphere. On a hot, sunny summer day, the sun can heat dry, exposed urban surfaces, such as roofs and pavement, to temperatures 50-90° F. (27-50° C.) hotter than the ambient air, while shaded or moist surfaces—often in more rural surroundings—remain closely aligned to ambient temperatures. Surface urban heat islands are typically present day and night, but tend to be strongest during the day when the sun is shining. The EPA states that these elevated temperatures from urban heat islands, particularly during the summer, can affect a community's environment and quality of life; the majority negative. These impacts include:

(1) Increased energy demand for cooling. Research shows that electricity demand for cooling increases 1.5-2.0% for every 1° F. (0.6° C.) increase in air temperature, starting from 68 to 77° F. (20 to 25° C.), suggesting that 5-10% of community-wide demand for electricity is used to compensate for the heat island effect. Peak electricity demand, instigated by the urban heat island, inevitably occurs on hot summer weekday afternoons when offices and homes are running cooling systems, lights, and appliances. The resulting demand for cooling can overload systems and require a utility to institute controlled, rolling brownouts or blackouts to avoid power outages.

(2) Elevated Emissions of Air Pollutants and Greenhouse Gases. Increasing energy demand generally results in greater emissions of air pollutants and greenhouse gas emissions from power plants. Higher air temperatures also promote the formation of ground-level ozone.

(3) Compromised Human Health and Comfort. Increased daytime temperatures, reduced nighttime cooling, and higher air pollution levels associated with urban heat islands can affect human health by contributing to respiratory difficulties, heat exhaustion, non-fatal heat stroke, and heat-related mortality. Excessive heat events, or abrupt and dramatic temperature increases, are particularly dangerous and can result in above-average rates of mortality. The Centers for Disease Control and Prevention estimates that from 1979-2003, excessive heat exposure contributed to more than 8,000 premature deaths in the United States. This figure exceeds the number of mortalities resulting from hurricanes, lightning, tornadoes, floods, and earthquakes combined.

(4) Impaired Water Quality. High pavement and rooftop surface temperatures can heat storm-water runoff. Tests have shown that pavements that are 100° F. (38° C.) can elevate initial rainwater temperature from roughly 70° F.

(21° C.) to over 95° F. (35° C.). This heated storm-water generally becomes runoff, which drains into storm sewers and raises water temperatures as it is released into streams, rivers, ponds, and lakes. Water temperature affects all aspects of aquatic life, especially the metabolism and reproduction of many aquatic species. Rapid temperature changes in aquatic ecosystems resulting from warm storm-water runoff can be particularly stressful, even fatal, to aquatic life.

There are four current strategies to mitigate the urban heat island effect:

(1) Increasing tree and vegetative cover over the general landscape;
(2) Creating rooftop gardens;
(3) Installing reflective roofs; and
(4) Employing cool pavement technologies (aggregate make-up).

Heat island mitigation is part of a community's energy, air quality, water, or sustainability effort. These activities may range from voluntary initiatives to policy actions, such as requiring cool roofs via building codes. Most mitigation activities have multiple benefits, including cleaner air, improved human health and comfort, reduced energy costs and lower greenhouse gas emissions.

As an alternative to powering vehicles using the internal combustion engine, designers have experimented with batteries, fuel cells, and solar panels. These experiments have been motivated, in large part, by a concern that gases emitted by internal combustion engines could harm humans by adversely affecting their environment. Motivated by these concerns, lawmakers have passed laws governing vehicle emissions. Accordingly, there is an ongoing need for sources of power that can supplement or replace the internal combustion engine as a source of power for vehicles. For similar reasons, there is a need for alternative stationary sources of power that reduce harmful environmental effects associated with the combustion of fossil fuels.

With a growing concern over global climate change, scientists, lawmakers, and entrepreneurs are all seeking solutions. At the forefront of this debate are new sources of power. These could provide an alternative to fossil fuels, which release harmful greenhouse gases.

Similarly, in addition to clean energy sources, it is important not to overlook methods to reduce the effects of global warming. Paving over vegetation allows more heat to be absorbed by the Earth's surface, and later reradiated into the atmosphere. This is particularly true in areas with heavy populations, roads and travel, where the necessity for paving is largest. This gives way to the Urban Heat Island effect, which has increased the needs of air conditioning in cities like Los Angles by over 40% during the summer months.

SUMMARY OF THE INVENTION

The methods and systems of the present invention use the heat absorbed by surfaces from incident solar radiation to produce energy in various forms. The systems and methods can use embedded thermally conductive materials or fluid carrying pipes in pavement as a structure to transfer heat for multiple uses. A heated fluid will first be moved to a heat exchanger. The heat produced can be used for hot water for hotels, laundromats, car washes, pre-heating of boilers, or chemical/industrial processes to name a few. The systems and methods can also produce electrical power through a low temperature generator such as one powered by an organic Rankine cycle engine. Heat from the system can drive an absorptive or adsorptive chiller to produce an air conditioning or cooling system. The system can be used in conjunction with or in series with another source, such as a Concentrated Solar Power system, to produce higher temperatures for more efficient power generation. Designs to improve efficiencies of the system include the use of thermally conductive roadway aggregates, low emissivity coatings, and use of guardrails, bridges and other thermally conductive structures as a heat source or heat transfer method. The system heat source can be used for pasteurization, distillation and the like therefore permitting use for water purification.

The present invention can use the aggregate itself as the conductive material instead of another thermally conductive material that would not normally be part of the HMA (hot mix asphalt). If thermally conductive materials are not available locally, they can be purchased and transported from non-local sources. A conductive layer can be put down within the surface to reduce the costs of what may be a more expensive aggregate material. This serves to increase the heat travel to essential regions for practical conversion. The heat collected from such surfaces can be used to run a thermal cycle engine (e.g., an organic Rankine cycle engine), a heat pump, or a chiller. The heat energy is used to heat a fluid such as water or refrigerant that is used in such systems. This provides a means of converting raw heat into more tangible or useful applications. A network of pipes can lead from the source (manufactured surface covering, such as a paved surface or structure) to the drain (energy conversion unit or heat exchanger). The pipes can be installed in a number of ways and can be made of various materials and geometries. Regardless of how they are installed, the commonality is the intention of removing heat from the pipes. The system can be used in conjunction with other energy sources, namely geothermal, photovoltaic, and biofuel. Additional uses include the use of these methods as a means to purify, decontaminate, desalinate, and clean water and to take heat from buildings and roadway structures.

A low temperature source such as geothermal, flat plate or paved surface, (roadway power system) can have its temperatures bolstered by a supplementary heating source. This source could be solar driven, e.g. concentrated solar power (CSP), parabolic, dish or a combustion engine, using gas, oil, or another incendiary source. These elevated temperatures allow use for agriculture, water purification and desalinization, biofuels, hydrogen generation and increased efficiencies with existing methods of energy conversion.

When using the present invention to generate electricity, it will relieve part of the dependency on 'dirty' power by bringing a new source of 'green' electricity generation. It will also help reduce loads on the electrical transmission systems since it will act as distributed generation on-site.

One aspect of the present invention is to simultaneously take advantage of the available and sustainable solar heat source to add a fifth strategy to heat island mitigation by utilizing a pavement embedded heat exchanger to deliver urban island waste heat that is particularly applicable to the working characteristic of an absorption chiller or an organic Rankine cycle engine. The methods and systems of the present invention simultaneously reduce energy demand for cooling while supplying a source of electrical energy to the grid, reduce the amount of air pollutants generated by fossil fuel fired electrical generating plants, enhance human comfort, and alleviate storm-water run-off temperatures.

In another aspect, the present invention uses heat from solar radiation on manufactured surfaces as an energy source. In one of its simplest forms the energy can be used to provide hot water to a system or structure. In other forms the energy can be used to provide cooling with an absorption or adsorption chiller, to provide electrical power with an organic Rankine cycle engine or to provide heating or cooling with a heat pump system.

The present invention overcomes or substantially alleviates long term problems of the prior art relating to thermal heat islands while providing cost effective delivery of solar energy conversion into electrical energy, heating or cooling.

Another aspect of the present invention is to use energy from solar radiation collected from manufactured surfaces as auxiliary and/or supplemental heat sources integrated to provide higher temperatures and to provide a broader energy source useful for operation of energy conversion equipment such as hot water supply, chillers (absorptive and adsorptive), heat pumps, organic Rankine cycles and integration into systems for water purification and distillation.

Various aspects, advantages and benefits of the present invention will become apparent from the following description taken in conjunction with the drawings.

DETAILED DESCRIPTION OF THE INVENTION

Figure 1:
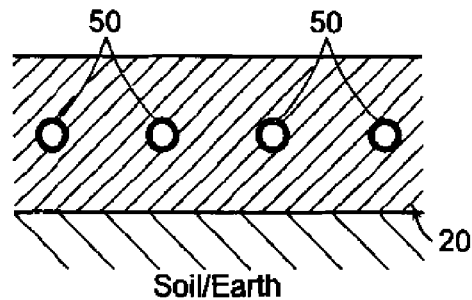
FIG. 1 is a sectional view of a manufactured surface covering for use with the present invention with embedded conduits.
Figure 11:
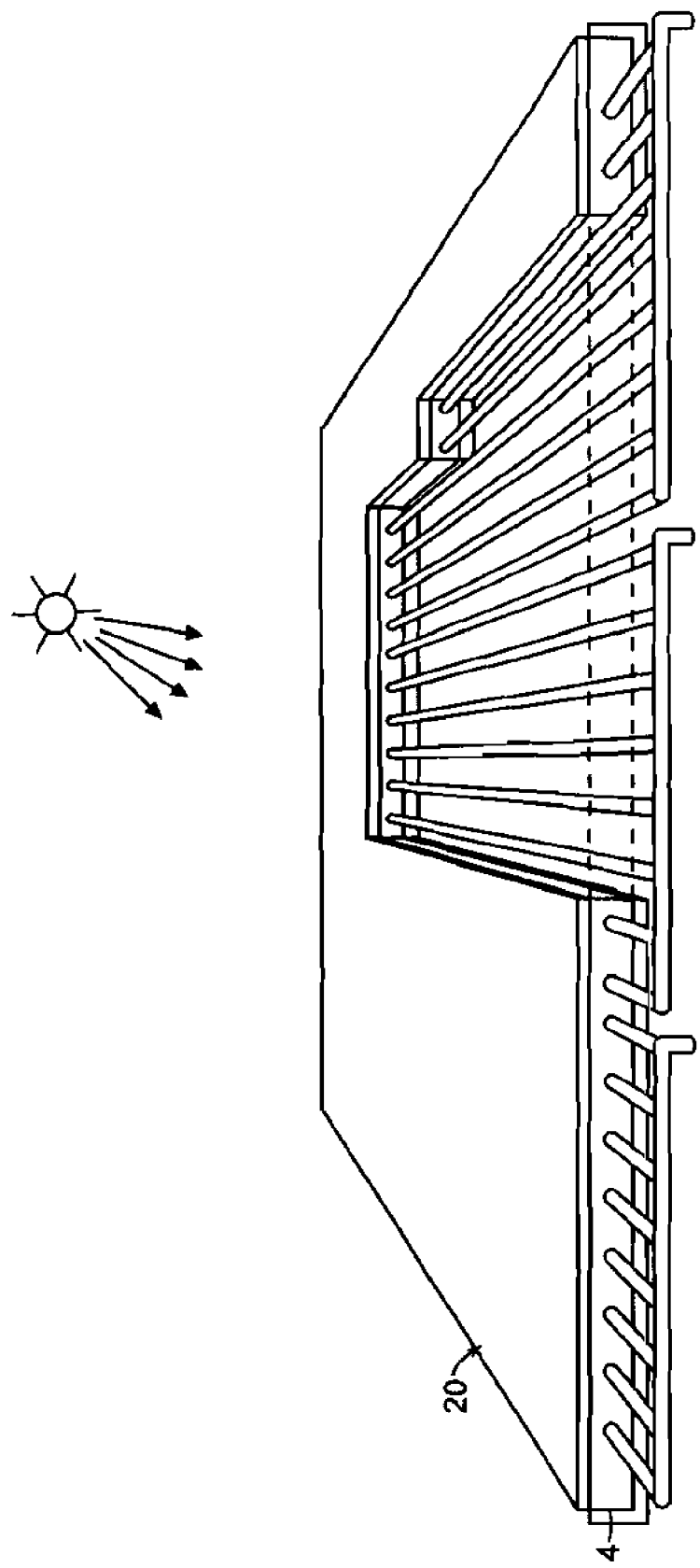
FIG. 11 is a perspective view of a manufactured surface covering, with parts cut away, for use with the present invention with a top surface exposed to the natural environment to receive precipitation and solar radiation.

Manufactured surface coverings for use with the systems and methods of the present invention for operating environmental equipment are shown in FIGS. 1, 2, 2A, 3 and 11. Manufactured surface coverings mean man-made structures having a top surface or layer exposed to the natural environment to receive solar radiation and, in some cases, precipitation. Environmental equipment means equipment that has an effect on the environment either inside or outside of structures such as, for example, chillers, heat pumps, water purification systems, distillation systems, heaters for air or water. As shown in FIG. 1, fluid carrying conduits 50 are embedded in a manufactured surface covering 52 resting on soil/earth. The fluid carrying conduits can be embedded at differing depths within the covering with varying spacing, and the fluid carrying conduits can be formed as a single loop, for example, running down the side of a driveway, road or sidewalk, or multiple loops covering the entire area of a surface. As shown in FIG. 11, the fluid carrying conduits 50 are installed in, on, under, next to, in contact with all or a portion of the layers of the manufactured surface covering such that the fluid carried by the conduits is heated by the layers of the covering which, in turn, are heated by incident solar radiation.

Figure 2:
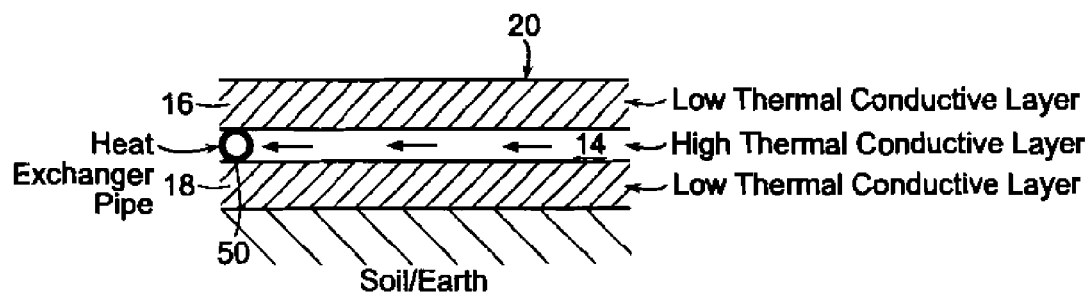
FIG. 2 is a sectional view of a manufactured surface covering for use with the present invention with a high thermal conductivity layer adjacent the conduits.
Figure 2A:
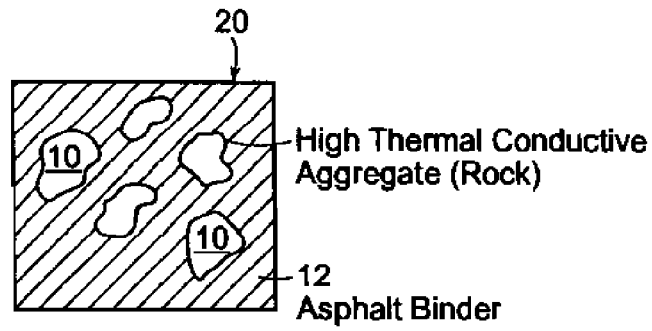
FIG. 2A is a sectional view of a high thermal conductive layer formed of aggregate in binder.

As shown in FIG. 2, the fluid carrying conduits are referenced as "heat exchanger pipe" and are disposed in a high thermal conductivity layer 14 to be on the same level therewith. An example of a high thermal conductivity layer 14 is shown in FIG. 2A and includes an asphalt binder 12 with high thermal conductivity aggregate 10 therein, increasing the efficiency of the manufactured surface covering in capturing heat from incident solar radiation on the covering. The high thermal conductive layer can be at any depth within the covering so as to be in the top low thermal conductive layer 16 and the bottom low thermal conductive layer 18. The high thermal conductive aggregate can be created by additives such as metal particles, wire, rods, rebar, conductive films or tapes, as well as conductive aggregate (rock) materials such as in the class of quartzite and sandstone.

Figure 3:
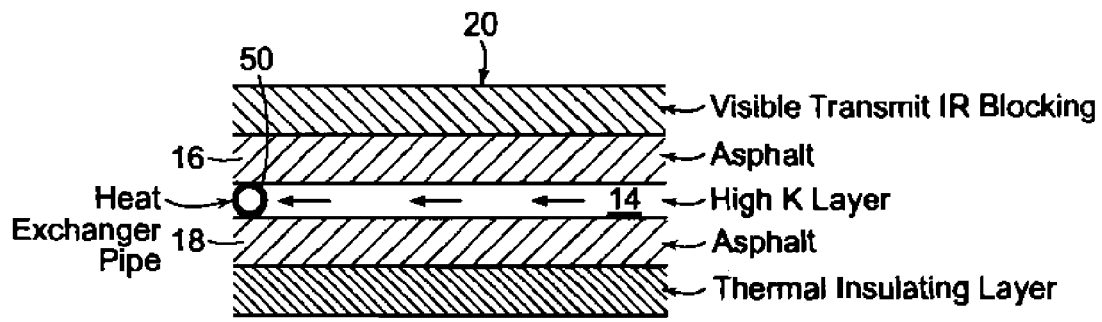
FIG. 3 is a sectional view of a manufactured surface covering for use with the present invention with a top visible transmitting layer, a high thermal conductive layer and a lower thermal insulating layer.

As shown in FIG. 3, the manufactured surface covering can have a top visible transmitting and infrared/heat blocking layer on a low thermal conductive layer and the fluid carrying conduits 50 can be disposed between layers of asphalt 16 and 18 constituting low thermal conductive layers. A manufactured surface covering for use with the present invention can be created with a visible wavelength light transmitting and infrared heat blocking top layer with embedded fluid carrying conduits but with no conductive layer and no lower heat insulating layer. Alternatively, the manufactured surface covering can be made with no visible wavelength light transmitting, infrared heat blocking top layer but with a thermal conductive layer and lower heat insulating layer. The purpose of the arrangement of the layers is to increase the efficiency of the system by allowing an increased percentage of heat energy to be captured by fluid in the conduits from the incident solar radiation on the manufactured surface covering. The top layer creates the "greenhouse effect" within the manufactured surface covering to allow light from the sun to enter the manufactured surface covering while trapping heat therein whereby more heat can be transferred to the fluid in the conduits 50 to drive a more efficient system. The top layer can be of a material type such as glass, ceramic, rock type materials, film, tape, a spray-on layer and liquid that hardens, for example.

Figure 4:
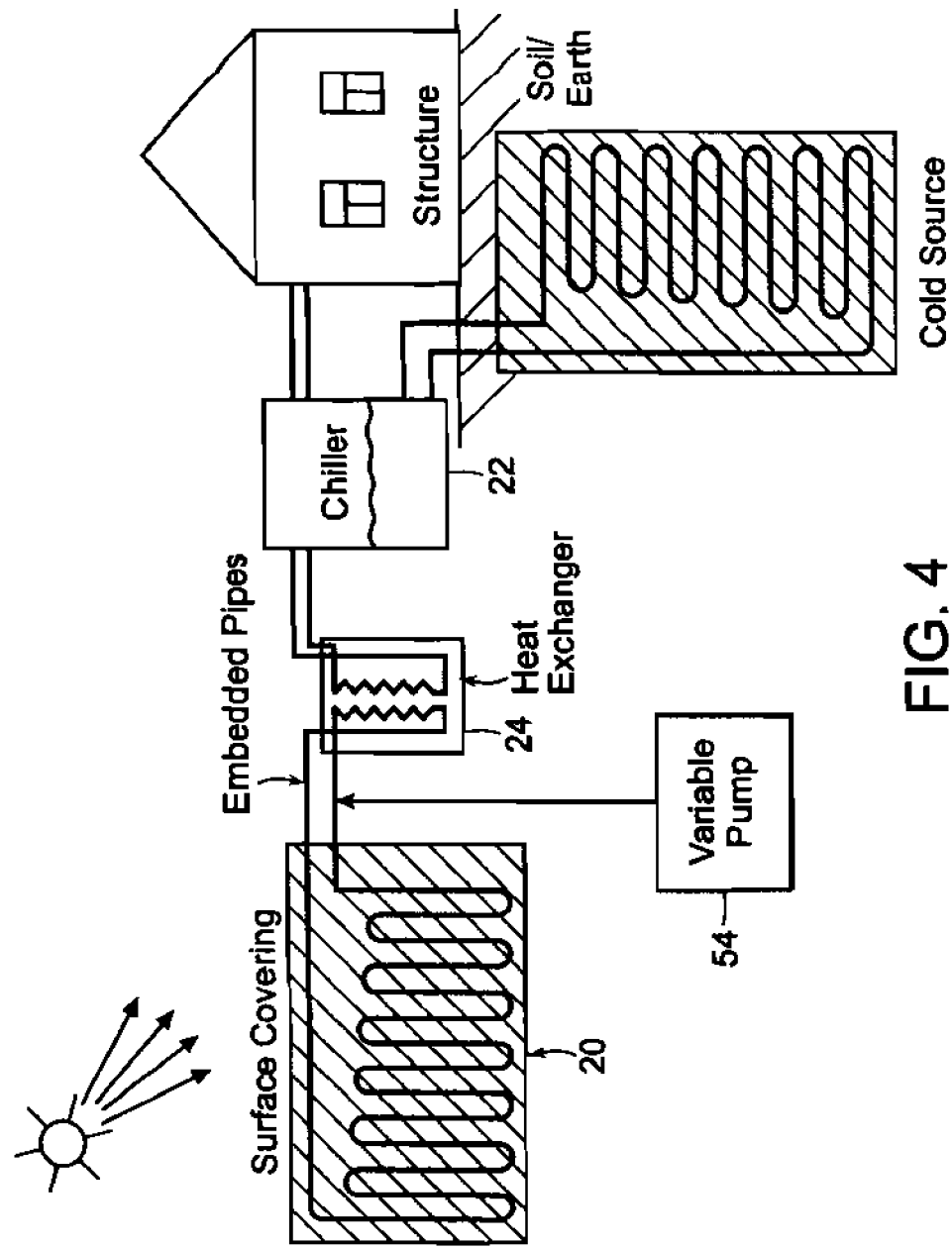
FIG. 4 is a diagrammatic/block diagram of a chiller system utilizing heat from the manufactured surface covering.

The system shown in FIG. 4 illustrates a chiller 22 operated by heat from the manufactured surface covering. Certain types of chillers become more economically viable than conventional chillers (such as compression cycle) when there is an available waste heat source. The system shown in FIG. 4 essentially has a waste heat source constituted by the solar heated manufactured surface covering 20, basically a free solar heat source, that can drive the chiller. The chiller types that can be used in the system shown in FIG. 4 include absorption (or absorptive), adsorption (or adsorptive) and desiccant. An optional cold source can be utilized to create a broader temperature differential for the chiller. Heat exchangers 24 can isolate fluid loops and assist in controlling temperatures, pressures and flow rates of the circulating fluid loops and fluid storage tanks. To this end, the system will include pump means for circulating fluid through the conduits with variable flow rates to control fluid temperature and pressure as shown at 52.

Figure 5:
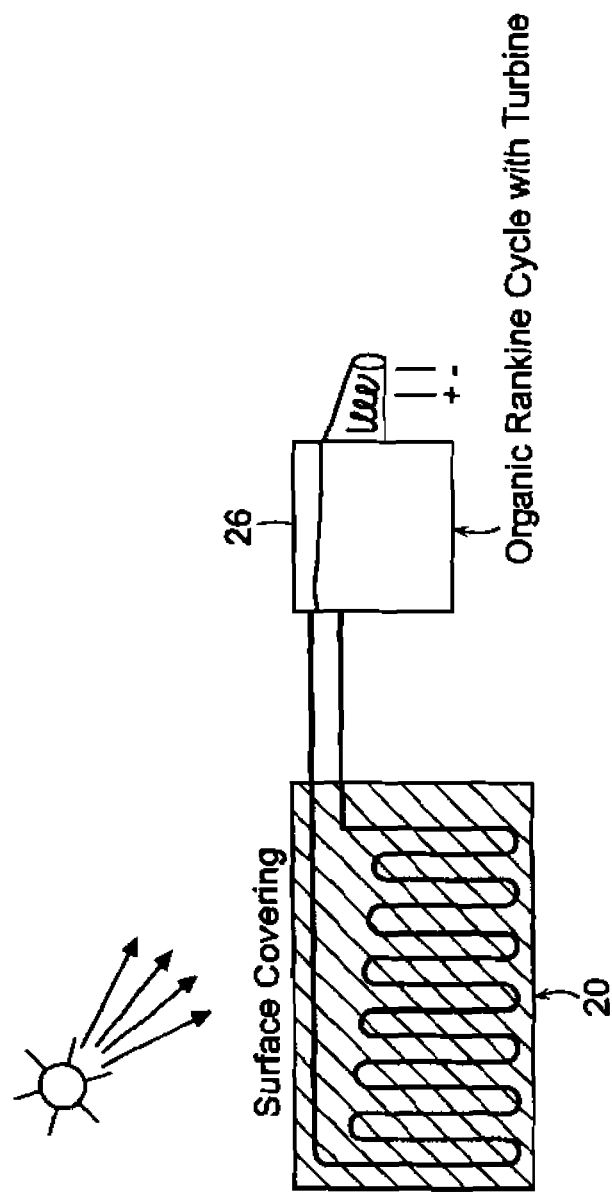
FIG. 5 is a diagrammatic/block diagram of an organic Rankine cycle engine operated by heat from the manufactured surface covering.

FIG. 5 shows an organic Rankine cycle engine 26 operated by heat from manufactured surface covering 20. By using a low boiling point fluid, the organic Rankine cycle engine uses an expanding gas cycle to drive a turbine to produce electricity. The organic Rankine cycle engine fuel source to heat the low boiling point fluid is the heat from the manufactured surface covering 20. A cold source can help create a broader temperature differential in the system. It should be appreciated that the system of the present invention can be used for other liquid-vapor phase cycles. The fluid can be an organic, high molecular mass fluid having a liquid-vapor exchange temperature lower than the water-steam phase temperature, and the fluid can be electrically insulating, fluorocarbon-based fluid utilizable in a liquid phase, a vapor phase or both liquid and vapor phases.

Figure 6:
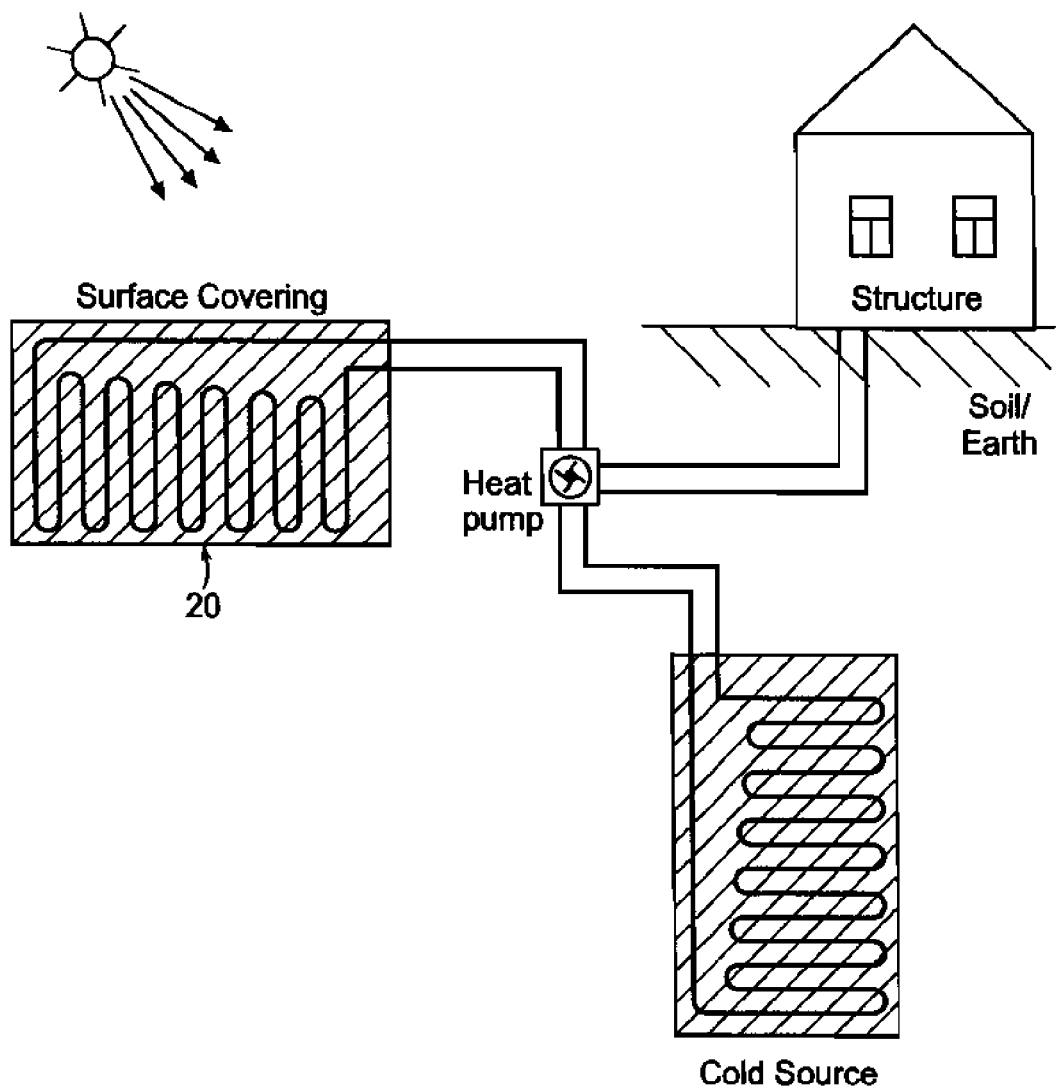
FIG. 6 is a diagrammatic/block diagram of a heat pump system operated by heat from the manufactured surface covering.

Energy conversion equipment in the form of a heat pump is shown in FIG. 6, and the heat pump is operated by heat from the manufactured surface covering via the fluid carried by the conduits. The heat pump system can be used to provide heating or cooling as is known. Solar radiation on the manufactured surface covering 20 creates heat which is extracted through a fluid-based heat exchanger to drive the heat pump.

Figure 7:
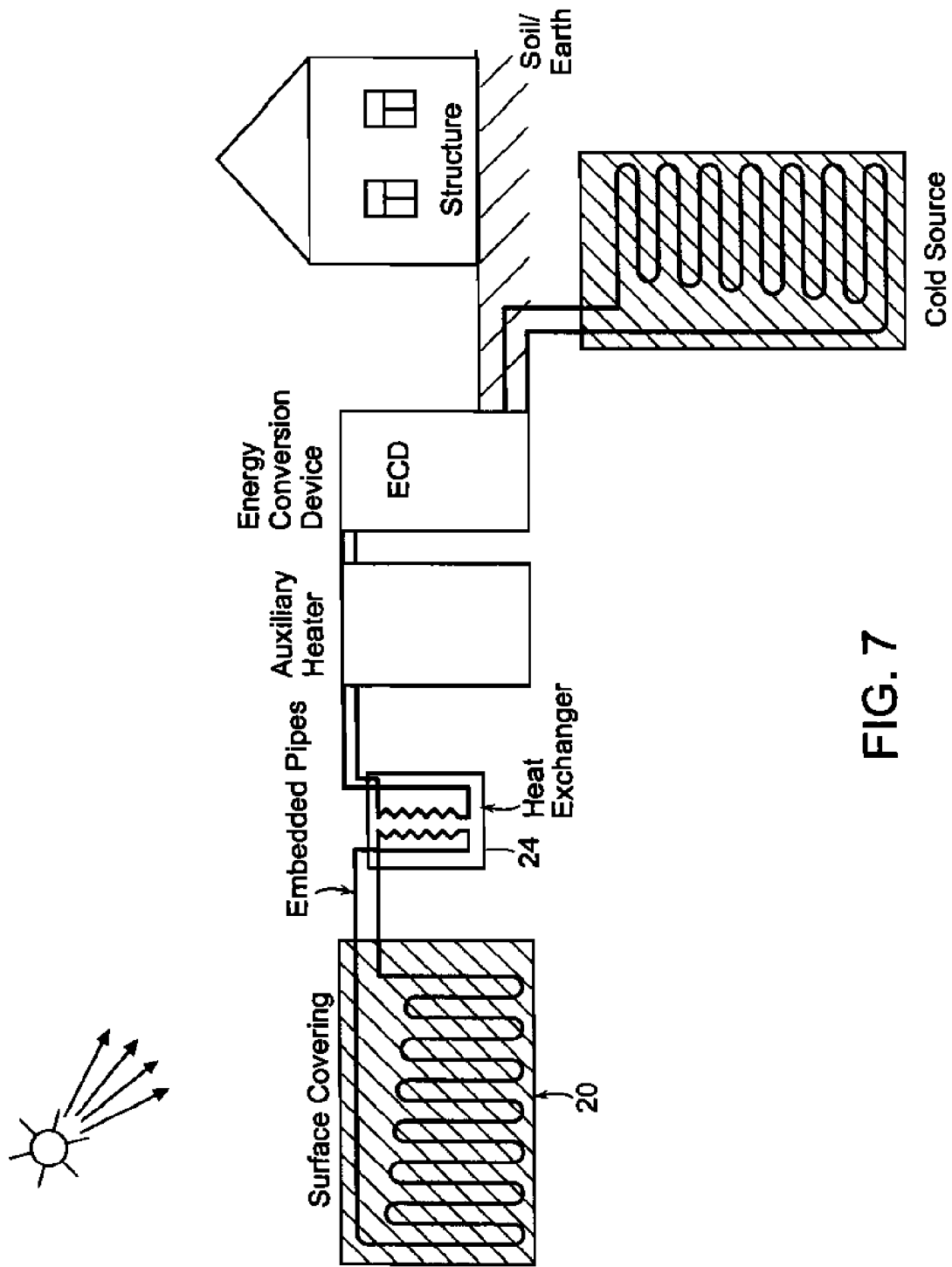
FIG. 7 is a diagrammatic/block diagram showing the use of an auxiliary heater along with heat from a manufactured surface covering to increase the temperature of fluid, to provide supplemental heat to the fluid and/or to run energy conversion equipment in times of low solar light.

FIG. 7 shows the use of an auxiliary heater before an energy conversion device (equipment) to increase the temperature of the fluid, to provide supplemental heat or to run the system in the event of cold weather or low solar light. The auxiliary heater can be basic, such as a gas-fired water heater. One purpose for use of the auxiliary heater is to boost or increase the temperature of the fluid coming from the manufactured surface covering. Higher temperatures can be more efficient in many types of energy conversion equipment. For example, absorption chillers typically become more efficient once the heat source is above 165° F.; meanwhile, average temperatures from the manufactured surface covering may be below 150° F. Likewise, organic Rankine cycle engines perform best with a greater temperature differential between the hot and cold sources ΔT. The auxiliary heater can increase the temperature of the fluid from the manufactured surface covering to produce a more efficient system, i.e. in the case of a chiller, to a temperature above 165° F. Auxiliary heaters can include solar based heaters, solar concentrators, concentrated solar power systems, Fresnel concentrators, concentrated photovoltaic systems, parabolic dishes, trough or flat plate solar devices, evacuated tube solar, solar-heated fluid in conduits, a solar heated mat with conduits, fossil fuel-fired fluid heaters, boilers, hydrogen-fired heaters and electric heaters. The auxiliary heater can run in series or parallel with the system and can be used to simply provide a supplemental source at a similar temperature to the temperature of the fluid derived from the manufactured surface covering.

Figure 8:
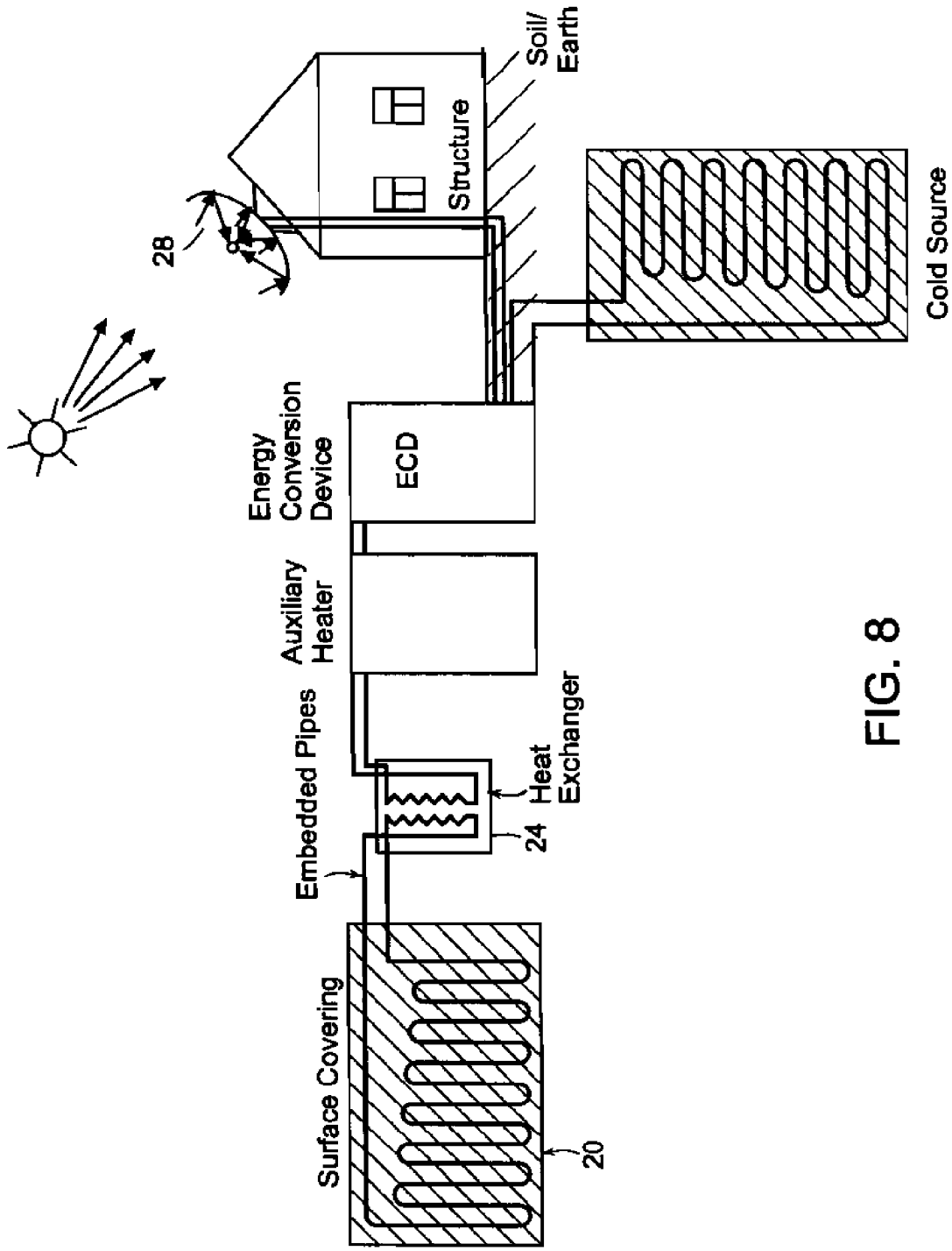
FIG. 8 is a diagrammatic/block diagram of a system utilizing the heat from a manufactured surface covering in combination with an auxiliary heater mounted on a building-type structure.

As shown in FIG. 8, the auxiliary heater can be disposed on a structure as shown at 28. The auxiliary heater can increase the temperature of the fluid coming from the manufactured surface covering and/or provide a supplemental source at a similar temperature to the temperature of the fluid from the manufactured surface covering as noted above. Multiple auxiliary heaters can be used dependent upon maximum use of available real estate. For example, at a specific facility, the primary source of heat/energy can be from a manufactured surface covering embedded in pavement covering a parking lot and be supplemented by evacuated tube collectors on a rooftop or a solar parabolic trough concentrator on the roof as shown in FIG. 8 or in the yard. The combined systems can be balanced using different sizes and ratios of the main source and the auxiliary sources including running without one portion of the setup, for example running with the rooftop based portion of the system heating the fluid but without the ground based parking lot setup.

Figure 9:
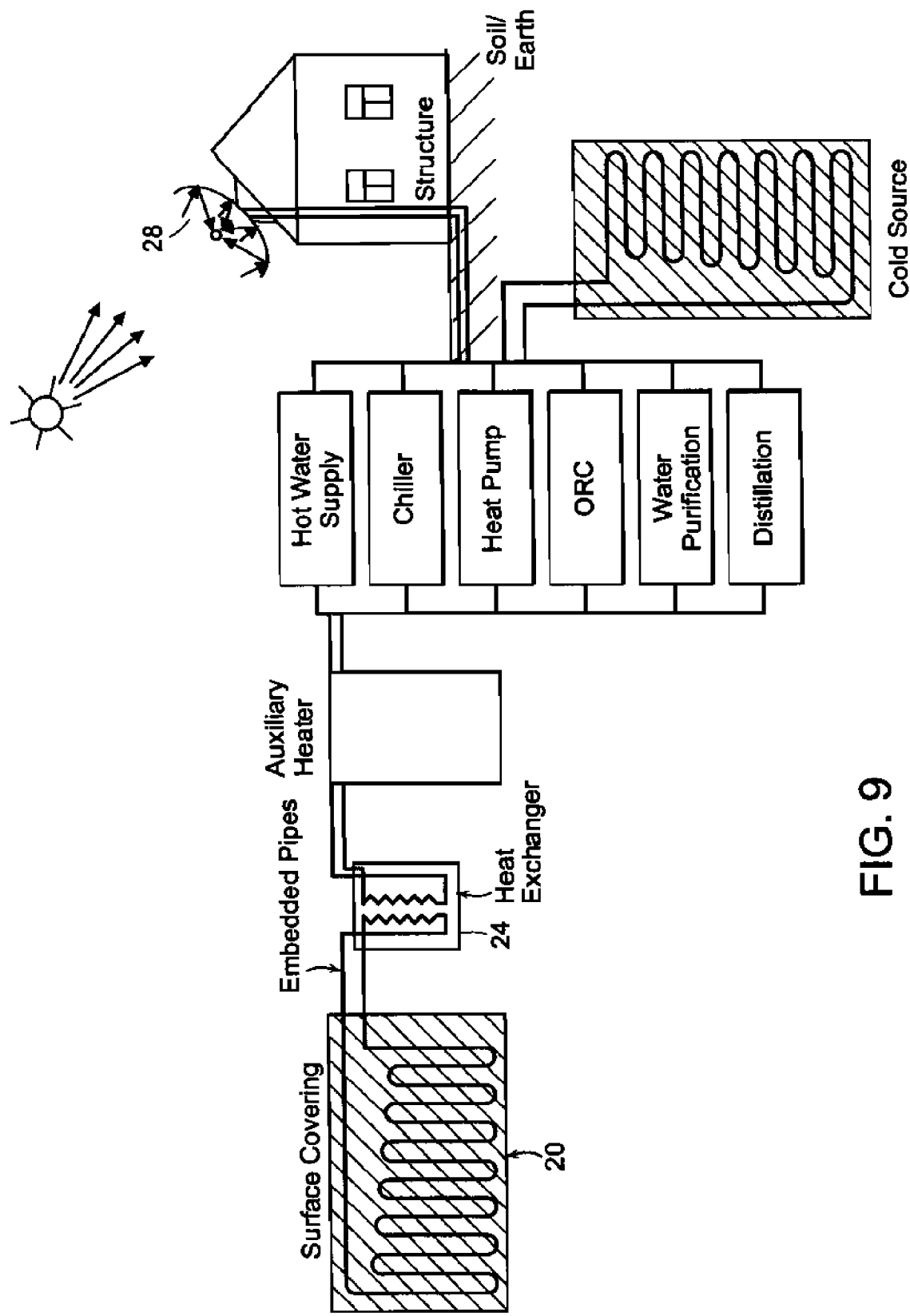
FIG. 9 is a diagrammatic/block diagram of a system operating environmental equipment utilizing the heat from a manufactured surface covering where energy conversion equipment is one or more of a hot water supply, a chiller, a heat pump, an organic Rankine cycle engine, water purification equipment and/or distillation equipment.

As shown in FIG. 9, the system for operating environmental equipment/energy conversion equipment can be used to operate hot water supply, chillers, organic Rankine cycle engines (ORC), heat pumps, water purification and/or distillation units. There are many facilities that have demands for multiple forms of energy supply. Hotels, for example, have hot water demands to provide washing facilities to the guestrooms and for laundry which is done after each guest stay. The hotel also might have a need for air conditioning (chilling) and perhaps a need for water purification. Accordingly, the combinations of energy conversion equipment shown in FIG. 9 offer the capability to satisfy most of the requirements of a facility. The hot water source can be used for many applications for preheatings of boilers and manufacturing/plant process water and for hydrogen production and biofuel production.

Figure 10:
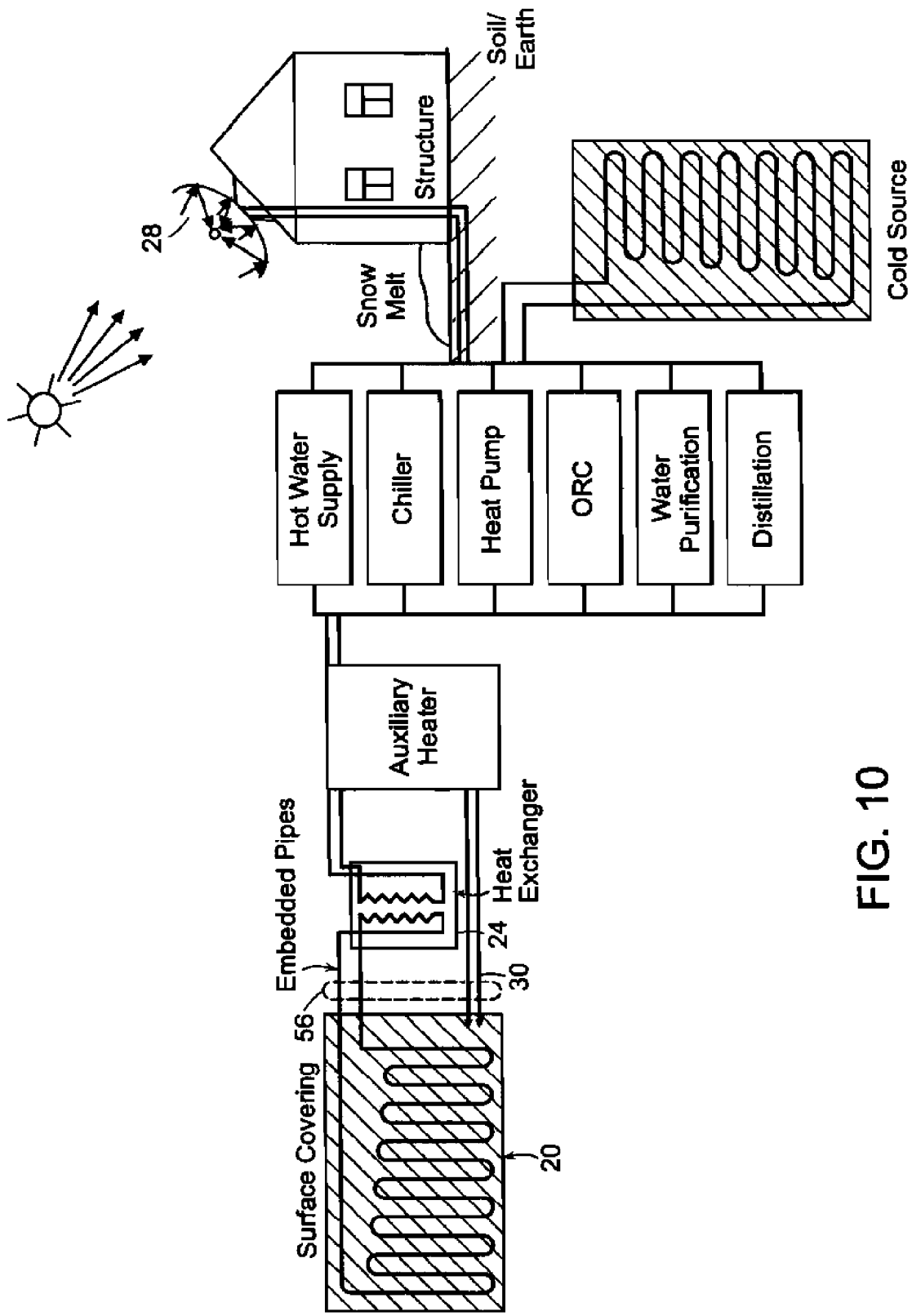
FIG. 10 is a diagrammatic/block diagram similar to the system shown in FIG. 9 with a reverse direction supply of heated fluid from the auxiliary heater to the manufactured surface covering for use in melting precipitation.

The system shown in FIG. 10 is similar to the system shown in FIG. 9 with the addition of a reverse direction of supply of heated fluid from the auxiliary heater to the manufactured surface covering for the purpose of melting precipitation on the top layer of the surface covering such as snow and/or ice. Separate conduits 30 can be used to supply heated fluid from the auxiliary heater to the manufactured surface covering or, the conduits within the manufactured surface covering can be used with appropriate valving 56 to supply heat to the surface covering. In certain regions of the world, at certain times of the year, the climate may not allow a heated fluid to be produced from the manufactured surface covering in that low outside temperatures or overcast skies could prevent the system from working properly. Accordingly, the system becomes less efficient in regions where there are broad seasonal temperatures variations. In these regions, the system as previously described cannot be efficiently operated the entire year. Accordingly, combining the feature of a snow/ice melt system can add value to the system in these regions.

As described above, high heat conductive aggregate in an asphalt binder improves the heat transfer in a pavement or structure and, thus, using more conductive rocks, aggregate, can improve heat transfer in the system. Use of thermally conductive additives to a pavement or hot asphalt mix (HMA) could have a negative impact on binding and structure. In addition, the high cost of certain metal-type additives could make them prohibitive as a conductive additive. Accordingly, the use of aggregate itself as the conductive material instead of another thermally conductive material that would not normally be part of the HMA or pavement is desirable.

Typically, it is most cost effective to construct new roadways, buildings cements and asphalts with locally available materials. Transport of large volumes of construction materials can become expensive and unnecessary if the needed materials are available locally. However, if thermally conductive materials are not available locally, the method of the present invention may require such materials to be purchased and transported from non-local sources. It is not always in the financial best interest to transport these materials from potentially distant sources, but with the present system there is incentive to do so.

As explained above, the manufactured surface covering has a high thermal conductive layer disposed within the surface between low thermal conductive layers and can reduce the cost of what may be a more expensive aggregate material. This layer will also make it possible to increase efficiency as the asphalt will conduct more heat through the layer and less energy will tend to be conducted inwards where it cannot be used.

The heat source from the manufactured surface covering can be used in conjunction with a system to produce cooling or air conditioning. Specifically the low temperature heat source can be attached to an adsorptive chiller, absorptive chiller, heat pump or other systems that use a refrigerant, desiccant, or the like via a heat exchanger. A chilling system that uses expanding gases to create a cooling effect can be fueled by heat. These systems, including adsorptive and absorptive chillers, are designed specifically to make use of low temperature heat sources and are often used for large scale cooling requirements. The heat that can be generated from paved surfaces, buildings and rooftops, with average temperatures of 120-150 F are perfectly matched for these chiller systems. The heat is used to heat a fluid such as water or refrigerant that is used in such systems.

The heat source from the manufactured surface covering can be used in conjunction with an organic Rankine cycle (ORC) system which uses an expanding low temperature gas to drive a turbine. ORC systems are currently being designed to work with geothermal heat sources.

In another embodiment, flexible pipes (conduits) can be used for collection of heat from construction fixtures and buildings. Use of modern flexible piping materials allows lower cost of installation and more durable systems. The pipe/conduit itself is used for heat transfer with the present invention. The pipes are extruded in geometries favorable to heat transfer with the outside media. Pipes extruded in different geometries such as with fins, oval, stars and the like promote better surface area and contact with the media. Having a pipe cross section with more surface area towards the horizontal plane will promote heat transfer since the top and bottom of the pavement are cooler than the center. That is, where an oval pipe cross section is used, the longer leg is preferably disposed vertically.

An alternate method to embedding the pipe prior to paving is to install the pipes in pavement prior to hardening of the pavement. Then the pipes are left exposed or are covered with an additional material. That is, the pipe gets pressed into the asphalt when it is still not hardened. This can be on a top layer or a middle layer. An asphalt roadway machine can be designed to press the hose into the still soft asphalt.

A grinding/milling machine can be used to mill a pipe channel into a surface to create channels or grooves wherein the pipe can be laid. The pipe is pressed into the channel, left exposed or covered with an additional roadway layer, as required. This arrangement is particularly effective in low energy demand projects, like home heating and cooling and/or pool heating.

Solar thermal energy can be harvested without embedding pipes below the surface. Materials are produced with internal pipes or channels to create a similar result. One design resembles a rubber speed bump with embedded grooves for the tubes, or a closed bladder, holding fluid above the surface, facilitating the easy placement and removal of the heating technology. Similar designs with internal fluid carrying channels can be used in roofing materials (shingles), siding materials, and surfacing materials such as driveway or patio bricks or in surface composites (e.g. Trex, or Timberteck). All the advantages of design are then applied to these "pre-fabricated" materials. Thermally conductive materials, low emissivity coatings and interlocking channels are design features dependent upon use conditions. In a simpler version, the fluid carrying channels are not within the materials, but a groove or channel is manufactured into the front or underside of the surface. Then a flexible hose or pipe is pressed into the channel. An advantage of this design is to limit the number of connections between panels, thus lowering the chance of a leak.

One manufactured surface covering has a narrow mat running up the side of a driveway or roadway. This will provide an additional safety measure to drivers as they will feel the hump if they accidentally come out of a lane and in danger of getting off of the road.

The system can collect heat from structures and buildings. The heat conductive materials used in municipal and traffic structures as well as buildings provide a source to capture, store and transport heat energy. Existing heat-conductive structures in bridges, overpasses, guardrails, railroad tracks, and the like, can be used to collect and transport heat. The structures themselves gain heat from incident radiation and they also act as a heat exchanger to pull heat from the paved surfaces and structures they are in contact with. Because of the thermal conductivity of these metal based structures, heat can be transported. A fluid based heat exchanger can be placed along the back of a guardrail or at periodic intervals. These structures include, but are not limited to, metal guard rails, metal utility poles, road signs, bridges, overpasses, and railroad tracks. A design to promote heat exchange between the surfaces and the metal structures and to enhance thermal transfer can include elongated footings added to guardrails to extend further into the roadway material. They provide additional contact area with the adjacent paved surface which will promote heat transfer. In another design, the structures are thermally insulated to hold the heat within and allow it to transport within the body to the heat exchanger. In the design using a metal guardrail, elongated fins or feet can extract heat from the paved surface while the plastic or rubber coated guardrail transports the heat within its metal structure to a heat exchanger.

The fluid carrying conduit of the system can be designed in a closed loop, where a heat exchanger is used to extract the heat. The heat exchanger is used to transfer heat from the fluid to a second fluid for use in various systems, i.e., to have two independent fluid loops so that the fluid that is used to collect the heat is kept separate from the working fluid used in the target system. Alternatively, the heat exchanger could be a radiator or similar structure to heat buildings (e.g., homes, hotels/motels, office buildings, etc.)

A heat exchanger between systems has several advantages including, but not limited to, fluids made up of different materials and are managed for different contaminants to add a longer life to the systems and allow for easier maintenance.

The heating source described herein can be used to produce, or assist in producing, clean or fresh water (desalination) and to reclaim and recycle wastewater. Certain purification processes are achieved from low temperature heating of the water. Low grade waters are used for irrigation systems for crops and the like. Pasteurization temperatures of 70° C. are achieved by the system. Clean water is becoming a scarce resource in some regions of the country and world. These systems will be used by governments or private property owners. In the Pacific southwest of the US, there are already shortages and rationing. Fighting for the limited sources between agriculture, towns and cities is underway. Meanwhile, this is still one of the fastest growing areas for population and construction of commercial and residential properties. Farms, lawns, golf courses and the like all have requirements for water. There are differences in water quality: potable, drinkable, for lawns, ponds, other uses. Further, desalination as a technology is important in areas of the world where fresh water is in short supply. The present heat source can be used for water purification and desalinization in membrane based purification systems. The higher temperature water contains atoms/molecules in an excited state which allows for easier separation of the undesirable elements at the membrane filter. Easier separation results in lower energy costs to push the fluid through the membrane. A further benefit is to keep the filters cleaner, preventing clogging, which allow a longer membrane filter life, lower energy costs and lower (less frequent) replacement costs.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A system for operating environmental equipment comprising
   a manufactured surface covering including a surface structure heated by solar radiation, and fluid carrying conduits embedded in said surface structure to be surrounded by and in contact with said surface structure such that fluid in said conduits is heated by said structure, said surface structure including a visible light transmitting/infrared heat blocking top layer, a thermal conductive layer below said top layer receiving said fluid carrying conduits and a thermal insulating layer below said thermal conductive layer;
   heat exchanger means communicating with said conduits to receive said heated fluid to produce heat generated energy; and
   energy conversion equipment coupled with said heat exchanger means to utilize said heat generated energy for operation.

2. The system for operating environmental equipment recited in claim 1 wherein said fluid is an organic, high molecular mass fluid having a liquid-vapor exchange temperature lower than the water-steam phase temperature.

3. The system for operating environmental equipment recited in claim 2 wherein said fluid is an electrically insulating, fluorocarbon-based fluid utilizable in a liquid phase, a vapor phase or both liquid and vapor phases.

4. The system for operating environmental equipment recited in claim 1 wherein said surface structure includes an upper, dark, heat absorbing, low reflectance layer.

5. The system for operating environmental equipment recited in claim 1 and further comprising pump means circulating said fluid through said conduits with variable flow rates to control fluid temperature and pressure.

6. The system for operating environmental equipment recited in claim 1 and further comprising a cold source coupled with said energy conversion equipment to create a temperature differential for operation of said energy conversion equipment.

7. The system for operating environmental equipment recited in claim 1 wherein said energy conversion equipment is a heat pump.

8. The system for operating environmental equipment recited in claim 1 wherein said energy conversion equipment is an organic Rankine cycle device.

9. The system for operating environmental equipment recited in claim 1 wherein said energy conversion equipment is a chiller.

10. The system for operating environmental equipment recited in claim 9 wherein the chiller fluid is a lithium bromide solution.

11. The system for operating environmental equipment recited in claim 1 wherein said energy conversion equipment operates on a liquid-vapor phase change cycle.

12. The system for operating environmental equipment recited in claim 1 wherein said energy conversion equipment produces useful power for a structure.

13. The system for operating environmental equipment recited in claim 12 wherein said power is in the form of heating, cooling and/or electricity.

14. The system for operating environmental equipment recited in claim 13 and further comprising an auxiliary heating system increasing the temperature of said fluid.

15. The system for operating environmental equipment recited in claim 14 wherein said auxiliary heating system is disposed on a roof of said structure.

16. The system for operating environmental equipment recited in claim 15 wherein said manufactured surface covering is disposed on said roof.

17. The system for operating environmental equipment recited in claim 1 wherein said fluid is stored in multiple tanks controlled to store said fluid at different temperatures and fluid from a lower temperature tank is circulated back to said conduits in said manufactured surface.

18. The system for operating environmental equipment recited in claim 1 wherein said manufactured surface covering includes a thermal conductive layer to increase thermal efficiency.

19. The system for operating environmental equipment recited in claim 1 wherein said manufactured surface covering includes a top layer structure exposed to the natural environment to receive precipitation and solar radiation and further comprising auxiliary heating means coupled with said manufactured surface covering for supplying heat to said manufactured surface covering to heat said top layer structure and melt any precipitation collected thereon.

20. The system for operating environmental equipment recited in claim 19 wherein said auxiliary heating means communicates with said conduits in said manufactured surface covering to supply heated fluid to said conduits and further comprising a valve arrangement selectively operable to allow fluid flow from said conduits to said heat exchanger means and to allow fluid flow from said auxiliary heating means to said conduits.

21. The system for operating environmental equipment recited in claim 1 wherein said energy conversion equipment is a water purification device.

22. The system for operating environmental equipment recited in claim 1 wherein said energy conversion equipment is a distillation device.

* * * * *